United States Patent
Dos Santos et al.

(10) Patent No.: US 6,587,468 B1
(45) Date of Patent: Jul. 1, 2003

(54) REPLY TO SENDER DHCP OPTION

(75) Inventors: Maria Alice Dos Santos, Redwood City, CA (US); Shujin Zhang, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/247,326

(22) Filed: Feb. 10, 1999

(51) Int. Cl.[7] .............................................. G06F 13/00
(52) U.S. Cl. ..................... 370/401; 370/410; 370/475; 709/245
(58) Field of Search ................................. 370/352, 353, 370/354, 355, 356, 400, 401, 410, 464, 465, 475, 696; 709/245, 227, 223

(56) References Cited

U.S. PATENT DOCUMENTS

| | | | |
|---|---|---|---|
| 4,769,810 A | 9/1988 | Eckberg, Jr. et al. | 370/60 |
| 4,769,811 A | 9/1988 | Eckberg, Jr. et al. | 370/60 |
| 4,933,937 A | 6/1990 | Konishi | 370/85.13 |
| 5,014,265 A | 5/1991 | Hahne et al. | 370/60 |
| 5,224,099 A | 6/1993 | Corbalis et al. | 370/94.2 |
| 5,241,594 A | 8/1993 | Kung | 380/4 |
| 5,367,517 A | 11/1994 | Cidon et al. | 370/54 |
| 5,423,002 A | 6/1995 | Hart | 395/200 |
| 5,430,715 A | 7/1995 | Corbalis et al. | 370/54 |
| 5,509,006 A | 4/1996 | Wilford et al. | 370/60 |
| 5,570,360 A | 10/1996 | Klausmeier et al. | 370/60 |
| 5,570,361 A | 10/1996 | Norizuki et al. | 370/60.1 |
| 5,592,470 A | 1/1997 | Rudrapatna et al. | 370/320 |
| 5,655,077 A | 8/1997 | Jones et al. | 395/187.01 |
| 5,668,857 A | 9/1997 | McHale | 379/93.07 |
| 5,678,006 A | 10/1997 | Valizadeh et al. | 395/200.02 |
| 5,684,950 A | 11/1997 | Dare et al. | 395/187.01 |
| 5,699,521 A | 12/1997 | Iizuka et al. | 395/200.15 |
| 5,802,316 A | 9/1998 | Ito et al. | 395/200.79 |
| 5,835,727 A | 11/1998 | Wong et al. | 395/200.68 |
| 5,883,893 A | 3/1999 | Rumer et al. | 370/395 |
| 5,884,024 A * | 3/1999 | Lim et al. | 709/245 |
| 5,944,824 A | 8/1999 | He | 713/201 |
| 5,959,990 A | 9/1999 | Frantz et al. | 370/392 |
| 5,974,453 A | 10/1999 | Andersen et al. | 709/220 |
| 6,009,103 A | 12/1999 | Woundy | 370/401 |
| 6,011,910 A | 1/2000 | Chau et al. | 395/200.59 |
| 6,026,441 A | 2/2000 | Ronen | 709/227 |
| 6,055,236 A | 4/2000 | Nessett et al. | 370/389 |
| 6,091,951 A | 7/2000 | Sturniolo et al. | 455/432 |
| 6,092,178 A | 7/2000 | Jindal et al. | 712/27 |
| 6,092,196 A | 7/2000 | Reiche | 713/200 |
| 6,119,160 A | 9/2000 | Zhang et al. | 709/224 |
| 6,141,687 A | 10/2000 | Blair | 709/225 |
| 6,212,563 B1 * | 4/2001 | Beser | 709/227 |
| 6,219,715 B1 * | 4/2001 | Ohno et al. | 709/245 |
| 6,243,749 B1 * | 6/2001 | Sitarman et al. | 709/223 |

OTHER PUBLICATIONS

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

(List continued on next page.)

Primary Examiner—Ricky Ngo
(74) Attorney, Agent, or Firm—Thelen Reid & Priest LLP; Marc S. Hanish

(57) ABSTRACT

A method for replying to a DHCP request packet is provided which allows a DHCP server to forward its reply packet directly back to the requester, thus permitting a gateway or similar device to make a DHCP request on behalf of a client. A reply to sender options field in the DHCP request packet is used to signify when the reply packet should be sent directly back to the requester. The method includes: examining the reply to sender field; extracting an address from the giaddr field if a flag in the reply to sender field is not set; forwarding a reply packet to said address extracted from the giaddr field if the flag in the reply to sender field is not set and said giaddr field is not empty; broadcasting a reply packet over a local subnet if the flag in the reply to sender field is not set and said giaddr field is empty; extracting a source network address from the source network address field if the flag in the reply to sender field is set; and forwarding a reply packet to said source network address if the flag in the reply to sender field is set.

20 Claims, 3 Drawing Sheets

OTHER PUBLICATIONS

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Droms, R., "Dynamic Host Configuration Protocol," Network Working Group, RFC 1531, Oct. 1993.

IBM, "IBM introduces new subscriber management system for Internet service providers", Dec. 2, 1998, IBM News, p. 1.

Network Registrar, "Hot Products & Solutions", American Internet Corporation, printed from http://www.american.com/networkregistrar, html, on Jul. 24, 1998.

Network Registrar, "Hot Products & Solutions—IP Address Management: A White Paper", American Internet Corporation, Bedford, MA, printed from http://www.american.com/ip-mgmt.html, on Jul. 24, 1998.

Network Registrar, "Hot Products & Solutions—Deploying Class of Service Using Network Registrar", American Internet Corporation, Bedford, MA, printed from http://american.com/applicationCOS-network.html, on Jul. 24, 1998.

Network Registrar, "Regain Confidence and Control Over Your IP Address Infrastructure", American Internet Corporation, Bedford, MA.

Rigney, et al., "Remote Authentication Dial In User Service (RADIUS)", Network Working Group, RFC 2138, Apr. 1997, pp. 1–57.

"Three Ways to Manage IP Addresses", PC Magazine: IP Address Management, printed from http://www.zdnet.com/pcmag/features/ipmanage/ip-s2.htm, on Sep. 10, 1998.

Carrel, D. et al., The TACACS+ Protocol, Version 1.78, Cisco Systems, Inc., printed from *ftp://ftp-eng.cisco.com/edweber/tac-rfc.1.78.txt* on Oct. 23, 2000.

* cited by examiner

REPLY TO SENDER DHCP OPTION

BACKGROUND OF THE INVENTION

1. Field of the Invention

The present invention relates to the Dynamic Host Configuration Protocol (DHCP) used in conjunction with large scale data communications networks such as the Internet. More particularly, the present invention relates to utilizing a DHCP server to allocate dynamic network addresses to various devices, rather than just to dial-up users.

2. The Background

As shown in FIG. 1, the Internet, or any large data communications network, 10 may be described as a group of interconnected computing networks (not shown) that are tied together through a backbone 12. The computing networks, in turn, provide access points, such as access points 14, 16 and 18, through which users may connect to the Internet via a station (a computer having a connection to a network) or host, such as hosts 20, 22, 24, and 26. An access point is essentially a location on the Internet that permits access to the Internet. An access point may include a modem pool (not shown) maintained by an ISP (Internet Services Provider) which enables its subscribers to obtain Internet access through a host having a dial-up connection. Those of ordinary skill in the art will recognize that other types of access methods may be provided by an ISP such as frame relay, leased lines, ATM (asynchronous transfer mode), ADSL, and the like.

Regardless of the access method used, each device (e.g., a host or router) that receives, sends and/or routes information between or among other devices on Internet 10 is configured to communicate with other devices using a communication protocol that may be understood by the other devices. The current communication protocol used by these devices on the Internet is TCP/IP (transmission control protocol/internet protocol). In addition, each device that can send or receive information (e.g., a host device) must also have a unique host address. The type of host address used for the Internet, or an equivalent switched network that uses TCP/IP, is commonly referred to as an IP address. A standard TCP/IP address in accordance with current standards is 4 bytes (32 bits) in length, providing a total of $2^{32}$ possible IP addresses. Those of ordinary skill in the art will readily recognize that not all of these possible IP addresses are available due to administrative expediencies, such as reserving blocks of IP addresses for future use.

Sending or receiving information using the TCP/IP protocol requires encapsulating information into packets. Each packet includes a header and a payload. The header contains information related to the handling of the payload by a receiving host or routing device, while the payload contains part or all of the user information. The information in the header includes the sender's and the recipient's addresses and is used to route the packet through the Internet until the packet is received by a host having an IP address that matches the packet's destination address (when referring to the source IP address and destination IP address of a packet, the source IP address and destination IP address are commonly referred to as "SA" and "DA", respectively). This enables users to accurately send and receive information with each other through their respective host computers.

By implementing a protocol common to all devices using Internet 10, users may send and receive information with other users on the Internet in a seamless manner regardless of geographic location or the type of host and/or interconnected network used.

The dramatic increase in popularity of the Internet in recent years has created a concern about the number of available IP addresses under the current standard (known as IP v.4). ISPs and domains are generally allocated a finite number of IP addresses. The ISPs and domains, therefore, are constantly looking for ways to limit the number of IP addresses they use while still providing access to the greatest number of users.

One solution for mitigating the effect of the number of users requiring host addresses is to dynamically allocate host addresses for users who do not have dedicated connections to the Internet, such as users who use dial-up access methods to connect to an ISP. Dynamic allocation of IP addresses entails having a pool of IP addresses, such as IP address pool, from which an ISP can draw from each time a valid subscriber (who does not use a dedicated connection or a connection that does not have a framed IP address, i.e., a static IP address) seeks to access the Internet. Once the subscriber logs on to an ISP and is properly authenticated, the ISP allocates an IP address for use by the user. This task is normally performed by a Dynamic Host Configuration Protocol (DHCP) server or service existing at the ISP (or other local segment of the Internet).

Upon log-off, the DHCP server releases the assigned/allocated IP address, rendering that IP address available for subsequent use by another user. In this way, a set of IP addresses can be used to provide access to a number of users that exceed the number of IP address comprising the IP address pool, assuming that at any given time the number of users seeking to log-on and obtain dynamic IP addresses is less than or equal to the number of IP address available in the IP address pool.

FIG. 2 is a diagram illustrating the format of a DHCP message. Message 50 includes an op field 52, which indicates whether the message is a request or a reply. An htype field 54 indicates the hardware address type. An hlen field 56 indicates the hardware address length. An hops field 58 is initially sent to zero by the client and is used by relay-agents. An xid field 60 indicates the transaction ID, which is a random number chosen by the client and used to associate messages with responses. A secs field 62 indicates the elapsed time (in seconds) since the client started trying to boot. The flags field 64 includes a number of different flags utilized by the client and server. The ciaddr field 66 indicates the client's IP address. The yiaddr field 68 indicates the offered or assigned temporary IP address. The siaddr field 70 is used to indicate the next server in a bootstrap. A bootstrap is a network of devices utilizing a bootstrap protocol, such as BOOTP (Bootstrap Protocol). The bootstrap protocol allows the devices to deliver assigned IP addresses and dynamically configure software to remote devices. The siaddr field 70 would then indicate the next server or device in the bootstrap. A giaddr field 72 indicates the relay agent's (if any) IP address. A chaddr field 74 indicates the client hardware address. Sname field 76 indicates an optional server host name. A file field 78 indicates a boot file name or options to be used by the client. Finally, a variable length options field 80 may utilize a number of predefined options, while allowing for new options to be created.

A subnet is an independent division of a network interconnected with the network. If a client is on the same sub-net as the DHCP server, the DHCP server simply broadcasts its reply, as every host on the local subnet can receive the broadcast. However, in large networks such as the Internet, a DHCP request packet is not directly sent from a client on the local subnet. Instead, the packet is indirectly passed from the client to the DHCP server through the use of relay agents or servers. In this case, the DHCP server will send its reply packet to the address found in the giaddr field 72, which is the address of the last relay agent or server. This relay agent or server will then pass the reply packet along to other relay agents or servers until it eventually reaches the client. However, the giaddr field 72 also is used as the subnet ID, which is depended upon by a DHCP server in allocating an IP address. The DHCP server will allocate an IP address that has the same subnet as the giaddr field 72. There may be times when this may create problems. For example, if one wants to allocate an IP address that has a different subnet from that of the relay agent, one will be unable to do so since both must match the giaddr field 72. Additionally, if a gateway is utilized to request an IP address for a user, the gateway may be utilizing the giaddr field 72 for IP pool identification, or other purposes. Finally, if the gateway requested the IP address, it is preferable to send the reply packet back directly to the gateway rather than to the client on whose behalf the gateway made the request. There may be other instances where it is inappropriate to send the reply packet to the address in the giaddr field 72 because either the field does not accurately reflect a destination which allows the packet to get back to the requestor, or the field is utilized for other purposes. It is therefore preferable to have a solution which allows the DHCP server to send the reply packet directly back to the requester.

SUMMARY OF THE INVENTION

A method for replying to a DHCP request packet is provided which allows a DHCP server to forward its reply packet directly back to the requester, thus permitting a gateway or similar device to make a DHCP request on behalf of a client. A reply to sender options field in the DHCP request packet is used to signify when the reply packet should be sent directly back to the requester. The method includes: examining the reply to sender field; extracting an address from the giaddr field if a flag in the reply to sender field is not set; forwarding a reply packet to said address extracted from the giaddr field if the flag in the reply to sender field is not set and said giaddr field is not empty; broadcasting a reply packet over a local subnet if the flag in the reply to sender field is not set and said giaddr field is empty; extracting a source network address from the source network address field if the flag in the reply to sender field is set; and forwarding a reply packet to said source network address if the flag in the reply to sender field is set.

A DHCP server is also provided for performing the method indicated above. The DHCP server includes: a reply to sender field examiner; a giaddr field extractor coupled to said reply to sender field examiner if the reply to sender field is not set; a reply packet broadcaster coupled to said giaddr field extractor if said giaddr field is empty; a reply packet forwarder coupled to said giaddr field extractor if said giaddr field is not empty and the reply to sender field is not set; a source network address extractor coupled to said reply to sender field examiner if the reply to sender field is set; and said reply packet forwarder coupled to said source network address extractor if the reply to sender field is set. A system including the DHCP server is also provided.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

While the present invention is described in a manner suitable for use with packets sent via the IP protocol, the invention may be modified to be used with any networking protocol. Additionally, the description of thee present invention refers to a DHCP server. This server may be contained in either hardware or software, and may not exist as a single unit, but rather may be a distributed system or service providing the functions of a DHCP server.

In accordance with a presently preferred embodiment of the present invention, the components, process steps, and/or data structures are implemented using a DHCP server. Different implementations may be used and may include other types of operating systems, computing platforms, computer programs, and/or general purpose machines. In addition, those of ordinary skill in the art will readily recognize that devices of a less general purpose nature, such as hardwired devices, devices relying on FPGA or ASIC technology, or the like, may also be used without departing from the scope and spirit of the inventive concepts disclosed herewith.

The present invention utilizes a novel reply to sender option field located within the DHCP packet to provide a DHCP server with the ability to forward a reply packet directly back to the device who made the DHCP request. This reply to sender field may take the form of a flag located in the options field 80. Since options field 80 is of variable length, the reply to sender flag will not utilize space that is needed for other information.

Figure 1:
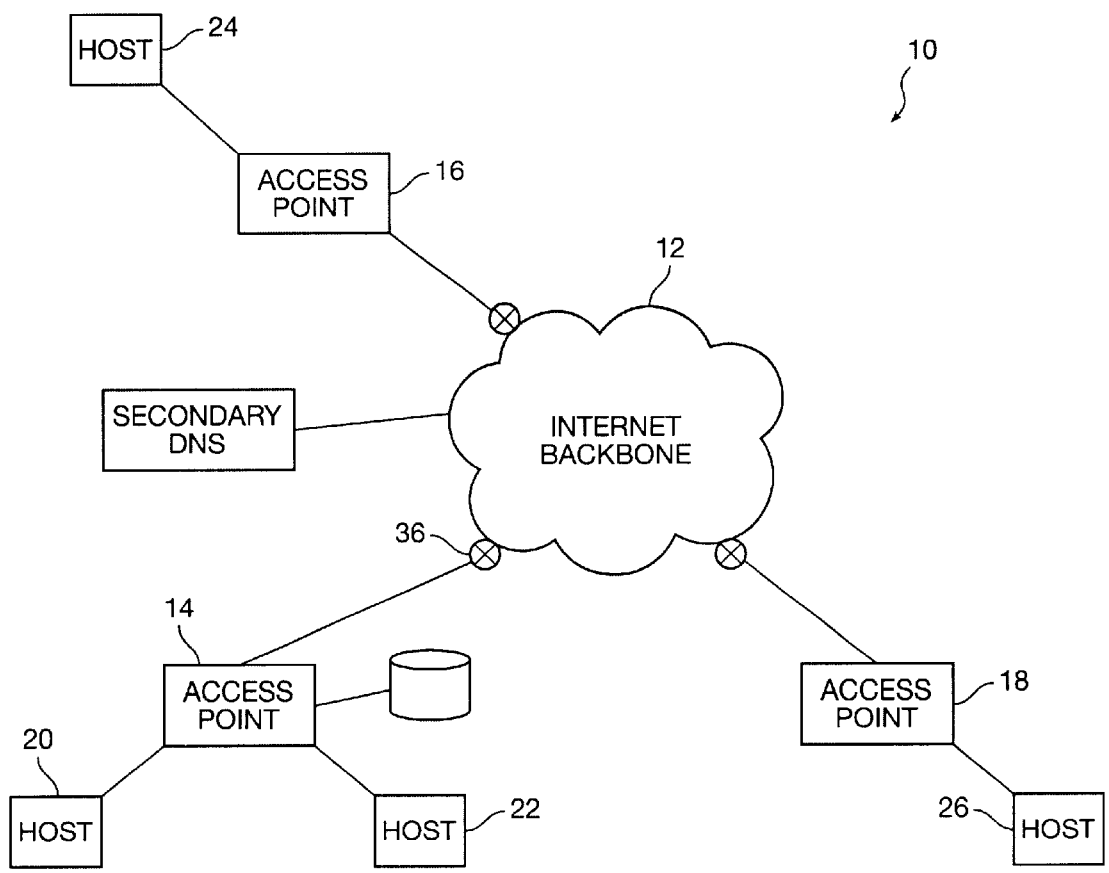
FIG. 1 is a block diagram of the Internet.
Figure 2:
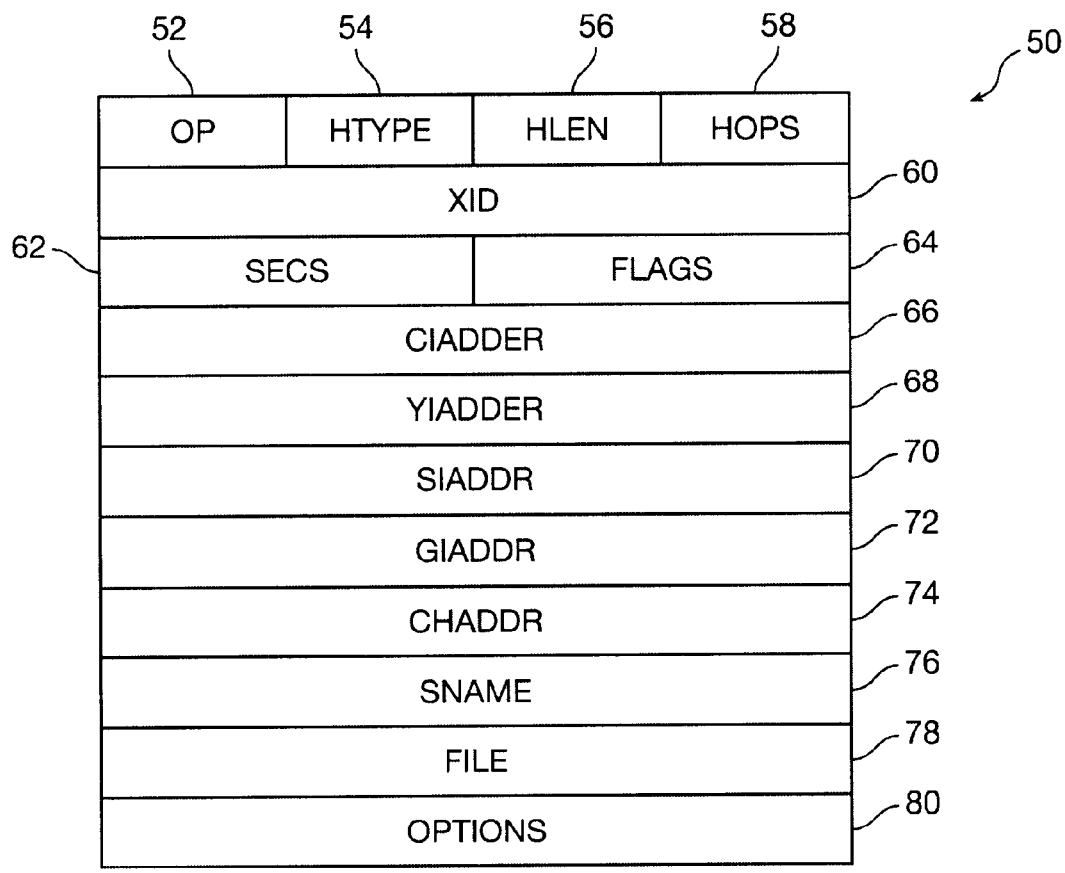
FIG. 2 is a diagram illustrating the format of a DHCP message.
Figure 3:
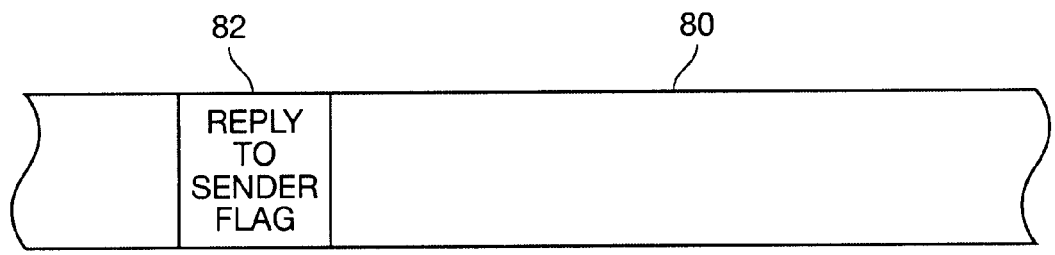
FIG. 3 is diagram illustrating an options field according to a presently preferred embodiment of the present invention.
Figure 4:
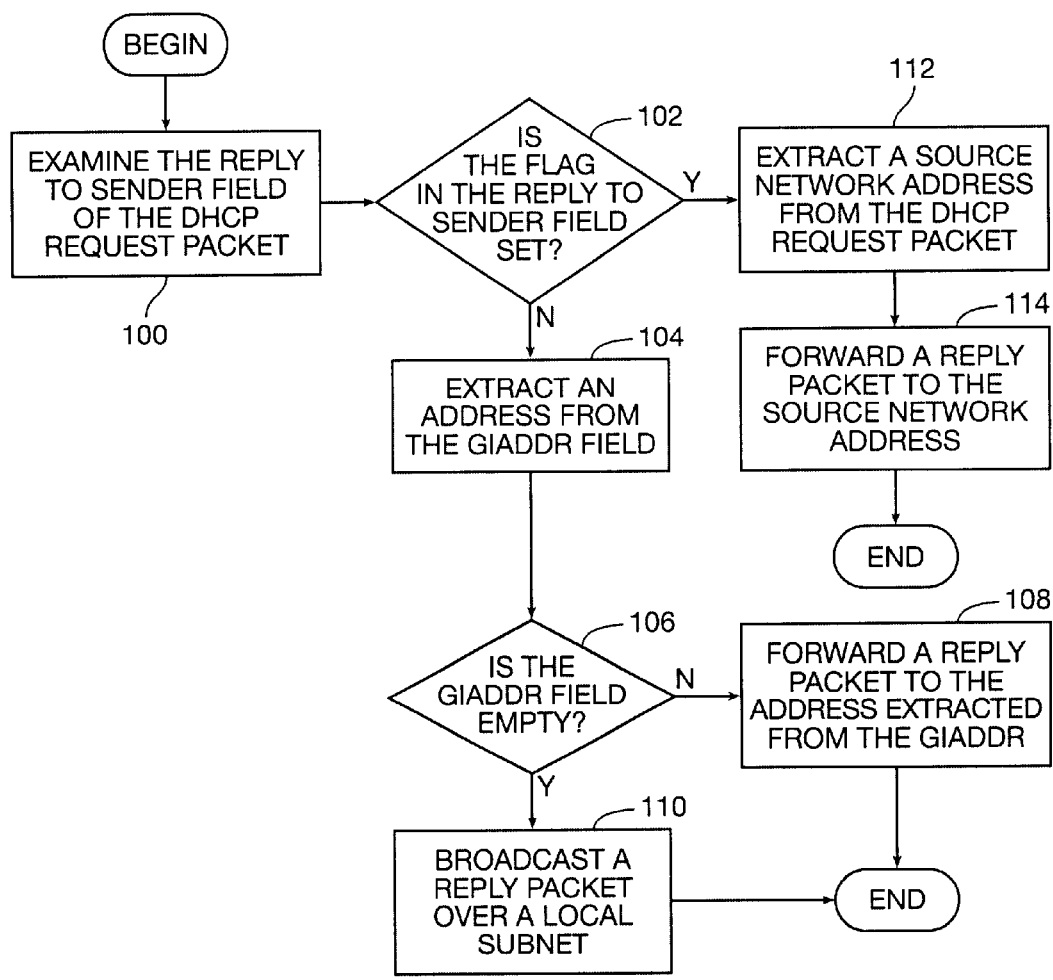
FIG. 4 is a flow diagram illustrating a method for replying to a DHCP request packet according to a presently preferred embodiment of the invention.

FIG. 3 is a diagram illustrating an options field in accordance with the present invention. Variable length options field 80 contains a reply to sender field 82, which is a flag that may be "set" or "not set" (1 or 0, respectively). FIG. 4 is a flow diagram illustrating a method for replying to a DHCP request packet in accordance with a presently preferred embodiment of the present invention. At 100, the reply to sender field of the DHCP packet is examined. At 102, it is determined if the flag in the reply to sender field is set or not set. If it is not set, it indicates that the DHCP request packet should be handled normally. In this case, it moves to 104, where an address is extracted from the giaddr field. At 106, it is determined if the giaddr field is empty (this would result in the address extracted in 104 being a null address or blank). If the giaddr field is not empty, at 108 a DHCP reply packet is forwarded to said address extracted from the giaddr field. If the giaddr field is empty, then the client device was not a relay agent and was located on the same local subnet. Therefore, at 110 a DHCP reply packet is broadcast over a local subnet, where it will eventually reach the client.

If the reply to sender flag was set, the method would attempt to send a DHCP reply packet directly back to the original requestor. In order to facilitate this, at 112 a source network address is extracted from the source network address field of the DHCP request packet. Then, at 114, a reply packet may be forwarded to the source network address. This allows for the response to a DHCP request to go directly back to the device that originated the request. An added advantage of this method is that it also provides for the possibility that the original requestor was a gateway making a request on behalf of a client. The method simply replies back to the original requester, no matter the form.

Figure 5:
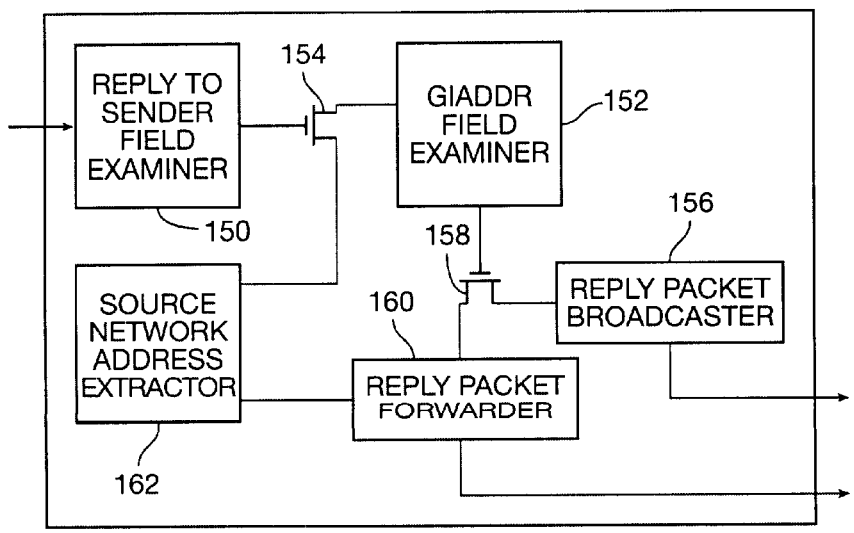
FIG. 5 is a block diagram illustrating a DHCP server for replying to a DHCP request packet according to a presently preferred embodiment of the present invention.

FIG. 5 is a block diagram illustrating a DHCP server for replying to a DHCP request packet in accordance with a presently preferred embodiment of the present invention. A reply to sender field examiner 150 examines the reply to sender field and determines if the flag is set or not set. The reply to sender field examiner 150 is coupled to a giaddr field extractor 152 via a switch 154 if the reply to sender flag is not set. The giaddr field examiner 152 extractor extracts an address from the giaddr field of the DHCP request packet. If the giaddr field is empty, the giaddr field extractor 152 is coupled to a reply packet broadcaster 156 via switch 158, which broadcasts a reply packet over a local subnet. If the giaddr field is not empty, the giaddr field extractor 152 feeds the address in the giaddr field to a reply packet forwarder 160 via switch 158. Reply packet forwarder 160 then forwards a reply packet to the address from the giaddr field.

Reply to sender field examiner 150 is coupled to a source network address extractor 162 via switch 154 if the reply to sender field is set. Source network address extractor 162 extracts a source network address from the source network address field of the DHCP request packet. Source network address extractor 162 is coupled to reply packet forwarder 160, to which it passes the source network address. Reply packet forwarder 160 then forwards a reply packet to the source network address.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for replying to a DHCP request packet, the DHCP request packet having a source network address field, a giaddr field, and a reply to sender field, the method including:

examining the reply to sender field in the DHCP request packet to determine if a reply packet should be directly forwarded to the address in the source network address field;

forwarding said reply packet to an address stored in the giaddr field if the reply to sender field indicates that said reply packet should not be directly forwarded to the address in the source network address field and the giaddr field is not empty; and forwarding said reply packet to the address in the source network address field if the reply to sender field indicates that said reply packet should be directly forwarded to the address in the source network address field.

2. The method of claim 1, wherein said reply to sender field is an option field in the DHCP request packet.

3. A method for replying to a DHCP request packet, the DHCP request packet having source network address field, a giaddr field, and a reply to sender field, the method including:

examining the reply to sender field in the DHCP request packet to determine if a reply packet should be directly forwarded to the address in the source network address field;

forwarding said reply packet to an address stored in the giaddr field if the reply to sender field indicates that said reply packet should not be directly forwarded to the address in the source network address field and the giaddr field is not empty;

broadcasting said reply packet over a local subnet if the reply to sender field indicates that said reply packet should not be directly forwarded to the address in the source network address field and the giaddr field is empty; and forwarding said reply packet to the address in the source network address field if the reply to sender field indicates that said reply packet should be directly forwarded to the address in the source network address field.

4. The method of claim 3, wherein said reply to sender field is an option field in the DHCP request packet.

5. A method for replying to a DHCP request packet, the DHCP request packet having a source network address field, a giaddr field, and a reply to sender field, the method including:

examining the reply to sender field;

extracting an address from the giaddr field if a flag in the reply to sender field is not set;

forwarding a reply packet to said address extracted from the giaddr field if the flag in the reply to sender field is not set and said giaddr field is not empty;

broadcasting a reply packet over a local subnet if the flag in the reply to sender field is not set and said giaddr field is empty;

extracting a source network address from the source network address field if the flag in the reply to sender field is set; and forwarding a reply packet to said source network address if the flag in the reply to sender field is set.

6. The method of claim 5, wherein said reply to sender field is an option field in the DHCP request packet.

7. A DHCP server for replying to a DHCP request packet, the DHCP request packet having a source network address field, a giaddr field, and a reply to sender field, the server including:

a reply to sender-field examiner;

a giaddr field extractor;

a reply packet forwarder;

a source network address extractor; and a switch coupling said reply to sender field examiner to said giaddr field extractor and said giaddr field extractor to said reply packet forwarder if the reply to sender field is set, said switch coupling said reply to sender field examiner to said source network address extractor and said source network extractor to said reply packet forwarder if the reply to sender field is not set and said giaddr field is not empty.

8. The DHCP server of claim 7, wherein said reply to sender field is an option field in the DHCP request packet.

9. A DHCP server for replying to a DHCP request packet, the DHCP request packet having a source network address field, a giaddr field, and a reply to sender field, the server including:

a reply to sender field examiner;

a giaddr field extractor;

a reply packet broadcaster;

a reply packet forwarder;

a source network address extractor; and a switch coupling said reply to sender field examiner to said giaddr field extractor and said giaddr field extractor to said reply packet broacaster if said giaddr field is empty and the reply to sender field is not set, said switch coupling said reply to sender field examiner to said reply packet forwarder if said giaddr field is empty and the reply to sender field is not set, said switch coupling said reply to sender field examiner to said source network address extractor and said source network address extractor to said reply packet forwarder if the reply to sender field is set.

10. The DHCP server of claim 9, wherein said reply to sender field is an option field in the DHCP request packet.

11. A program storage device readable by a machine, tangibly embodying a program of instructions executable by the machine to perform method steps for replying to a DHCP request packet, the DHCP request packet having a source network address field, a giaddr field, and a reply to sender field, the method including:

examining the reply to sender field in the DHCP request packet to determine if a reply packet should be directly forwarded to the address in the source network address field;

forwarding said reply packet to an address stored in the giaddr field if the reply to sender field indicates that said reply packet should not be directly forwarded to the address in the source network address field and the giaddr field is not empty; and forwarding said reply packet to the address in the source network address field if the reply to sender field indicates that said reply packet should be directly forwarded to the address in the source network address field.

12. The program storage device of claim 11, wherein said reply to sender field is an option field in the DHCP request packet.

13. A program storage device readable by a machine, tangibly embodying a program of instructions executable by the machine to perform method steps for replying to a DHCP request packet, the DHCP request packet having a source network address field, a giaddr field, and a reply to sender field, said method including:

examining the reply to sender field in the DHCP request packet to determine if a reply packet should be directly forwarded to the address in the source network address field;

forwarding said reply packet to an address stored in the giaddr field if the reply to sender field indicates that said reply packet should not be directly forwarded to the address in the source network address field and the giaddr field is not empty;

broadcasting said reply packet over a local subnet if the reply to sender field indicates that said reply packet should not be directly forwarded to the address in the source network address field and the giaddr field is empty; and forwarding said reply packet to the address in the source network address field if the reply to sender field indicates that said reply packet should be directly forwarded to the address in the source network address field.

14. The program storage device of claim 13, wherein said reply to sender field is an option field in the DHCP request packet.

15. A program storage device readable by a machine, tangibly embodying a program of instructions executable by the machine to perform method steps for replying to a DHCP request packet, the DHCP request packet having a source network address field, a giaddr field, and a reply to sender field, said method including:

examining the reply to sender field;

extracting an address from the giaddr field if a flag in the reply to sender field is not set;

forwarding a reply packet to said address extracted from the giaddr field if the flag in the reply to sender field is not set and said giaddr field is not empty;

broadcasting a reply packet over a local subnet if the flag in the reply to sender field is not set and said giaddr field is empty;

extracting a source network address from the source network address field if the flag in the reply to sender field is set; and forwarding a reply packet to said source network address if the flag in the reply to sender field is set.

16. The program storage device of claim 15, wherein said reply to sender field is an option field in the DHCP request packet.

17. A communications system including:

a gateway;

a DHCP server for replying to a DHCP request packet, the DHCP request packet having a source network address field, a giaddr field, and a reply to sender field, the server including:

a reply to sender field examiner;

a giaddr field extractor;

a reply packet forwarder;

a source network address extractor; and a switch coupling said reply to sender field examiner to said giaddr field extractor and said giaddr field extractor to said reply packet forwarder if the reply to sender field is set, said switch coupling said reply to sender field examiner to said source network address extractor and said source network extractor to said reply packet forwarder if the reply to sender field is not set and said giaddr field is not empty.

18. The communications system of claim 17, wherein said reply to sender field is an option field in the DHCP request packet.

19. A communications system including:

a gateway;

a DHCP server for replying to a DHCP request packet, the DHCP request packet having a source network address field, a giaddr field, and a reply to sender field, the server including:

a reply to sender field examiner;

a giaddr field extractor;

a reply packet broadcaster;

a reply packet forwarder;

a source network address extractor; and a switch coupling said reply to sender field examiner to said giaddr field extractor and said giaddr field extractor to said reply packet broacaster if said giaddr field is empty and the reply to sender field is not set, said switch coupling said reply to sender field examiner to said reply packet forwarder if said giaddr field is empty and the reply to sender field is not set, said switch coupling said reply to sender field examiner to said source network address extractor and said source network address extractor to said reply packet forwarder if the reply to sender field is set.

20. The DHCP server of claim 19, wherein said reply to sender field is an option field in the DHCP request packet.

* * * * *

UNITED STATES PATENT AND TRADEMARK OFFICE
CERTIFICATE OF CORRECTION

PATENT NO. : 6,587,468 B1
DATED : July 1, 2003
INVENTOR(S) : Maria Alice Dos Santos and Shujin Zhang It is certified that error appears in the above-identified patent and that said Letters Patent is hereby corrected as shown below:

Column 2,
Line 56, replace "Afile" with -- A file --.

Column 6,
Line 44, replace "sender-field" with -- sender field --.

Column 7,
Line 3, replace "broacaster" with -- broadcaster --.

Column 8,
Line 54, replace "broacaster" with -- broadcaster --.

Signed and Sealed this

Twenty-first Day of October, 2003

JAMES E. ROGAN
*Director of the United States Patent and Trademark Office*